US008273555B2

(12) United States Patent
Haering et al.

(10) Patent No.: US 8,273,555 B2
(45) Date of Patent: Sep. 25, 2012

(54) PROCESS FOR ESTERIFYING OR TRANSESTERIFYING SIDE CHAINS IN POLYMERS

(75) Inventors: Dietmar Haering, Neu-Edingen (DE); Lidcay Herrera Taboada, Oostende (BE); Bernhard Hauer, Fussgoenheim (DE); Thomas Friedrich, Darmstadt (DE); Alexander Goethlich, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 835 days.

(21) Appl. No.: 12/095,068

(22) PCT Filed: Nov. 24, 2006

(86) PCT No.: PCT/EP2006/068882
§ 371 (c)(1),
(2), (4) Date: May 27, 2008

(87) PCT Pub. No.: WO2007/063037
PCT Pub. Date: Jun. 7, 2007

(65) Prior Publication Data
US 2010/0062500 A1    Mar. 11, 2010

(30) Foreign Application Priority Data
Nov. 29, 2005    (DE) .......................... 10 2005 056 767

(51) Int. Cl.
*C12P 7/64* (2006.01)
*C12N 9/00* (2006.01)
*C12N 9/16* (2006.01)
*C12N 9/20* (2006.01)
*C07H 21/04* (2006.01)

(52) U.S. Cl. ........ 435/134; 435/183; 435/196; 435/198; 536/23.2

(58) Field of Classification Search ........................ None
See application file for complete search history.

(56) References Cited

U.S. PATENT DOCUMENTS

| | | | |
|---|---|---|---|
| 3,968,148 | A | 7/1976 | Leister et al. |
| 5,133,898 | A | 7/1992 | Fock et al. |
| 5,338,485 | A | 8/1994 | Fock et al. |
| 6,268,521 | B1 | 7/2001 | Gruning et al. |
| 2004/0082023 | A1* | 4/2004 | Gross et al. .................. 435/41 |
| 2006/0009589 | A1* | 1/2006 | Haering et al. ............ 525/330.1 |
| 2006/0148975 | A1 | 7/2006 | Rink et al. |

FOREIGN PATENT DOCUMENTS

| | | |
|---|---|---|
| EP | 0 386 507 | 9/1990 |
| EP | 0 999 229 | 5/2000 |
| JP | S48-056613 A | 8/1973 |
| JP | S59-501268 A | 7/1984 |
| JP | H11-060643 A | 3/1999 |
| WO | WO8400371 | 2/1984 |
| WO | 2004/042069 | 5/2004 |

OTHER PUBLICATIONS

Athawale et al. Biotechnol Prog. Mar.-Apr. 2003;19(2):298-302.*
Sun et al. Journal of Polymer Science, Part A: Polymer Chemistry (2004), 42(23), 6071-6080.*
Konstantin Pavel, et al., "Lipase-Catalyzed Esterification of Carboxyl-Terminated Mcthacrylic Oligomers and Copolymers With Isopropyi Alcohol and 9-Fluorenylmethanol", Mokromol. Chem. 194, pp. 3369-3376 (1993).
Pranee Inprakhon, et al., "Regioselective Modification of Methyl Acrylate Telomers by Enzyme Catalysis. Part 2. Influence of the Telogen Segment on the Selectivity", Designed Monomers and Polymers. vol. 4, No. 1 pp. 95-106, (2001).
Thiery Lalot, et al,. "Lipozyme-Catalyzed Transesterification of Oligo(Methylacrylate)s", Polymer Bullotin 26, pp. 55-62, (1991).
Rajesh Kumar, et al., "Green"-Enzymatic Synthesis of Pegylated Phenolic Macromer and Polymer, Chem. Commun., 2004, pp. 862-863.
Notification of Reasons for Refusal issued Nov. 4, 2011, in Japanese Patent Application No. 2008-542739, filed Nov. 24, 2006 (with English-language Translation).

* cited by examiner

*Primary Examiner* — Christian Fronda
(74) *Attorney, Agent, or Firm* — Oblon, Spivak, McClelland, Maier & Neustadt, L.L.P.

(57) ABSTRACT

Provided is a process for esterifying or transesterifying side chains in polymers, which involves esterifying or transesterifying the carboxyl group having the $R^4$ radical of a copolymer obtained by polymerizing a (meth)acrylate of formula (I), and a monomer of formula (II):

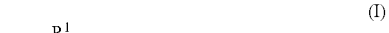

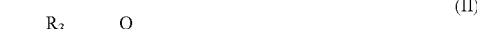
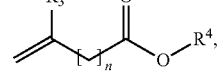

wherein $R^1$ and $R^3$ are independently H or $CH_3$, $R^2$ and $R^4$ are independently H or an alkyl radical which is optionally substituted by functional groups such as acryloyl, ether, amino, epoxy, halogen or sulfonic acid groups, and n is from 1 to 40, with an alcohol in the presence of an enzyme which catalyzes the esterifying or transesterifying. Further provided is the esterified or transesterified polymer product and its use.

20 Claims, No Drawings

PROCESS FOR ESTERIFYING OR TRANSESTERIFYING SIDE CHAINS IN POLYMERS

The present invention relates to a process for esterifying or transesterifying side chains in polymers, to the polymers as such preparable by this process and to the use of such polymers.

Polymers which are prepared fully or partly from acrylates and/or methacrylates are referred to as poly(meth)acrylates, the polymerization being performable, if appropriate, in the presence of one or more further monomers which are polymerizable with (meth)acrylates. Numerous fields of application of poly(meth)acrylates are known; for example, they are suitable as fiber protectants in laundry detergents, as corrosion protectants or as complexing agents. For what end use poly(meth)acrylates are best suited depends upon whether and, if appropriate, with which further monomers they are copolymerized or whether the resulting polymer is modified further. Accordingly, processes with which poly(meth)acrylates can be modified are of great interest.

One possibility is to introduce functional groups actually on monomer basis and subsequently to polymerize the monomers modified in this way to give the desired poly(meth)acrylate (derivative). For instance, EP-A 0 999 229 relates to a process for preparing acrylic esters and/or methacrylic esters of polyoxyalkylenes. In this process, the particular monomers (acrylic and/or methacrylic acid or their esters) are esterified or transesterified with polyoxyalkylenes in the presence of a catalyzing enzyme. The enzymes listed are hydrolases, especially esterases, lipases and proteases, and also, as a specific working example, the commercial product Novozym 435®. However, the polymerization of these monomers is not described in EP-A 0 999 229. When, however, this reaction path is to be taken, it is problematic that, firstly, depending on the modification type, the corresponding monomers are unstable and often cannot be polymerized without decomposition. Secondly, a monomer modification can also have the effect that the corresponding monomer is copolymerizable only with a small number of further monomers. For these reasons, modification actually at monomer level is prevented.

EP-A 0 386 507, in contrast, relates to a process in which polyacrylic esters with long-chain hydrocarbon and polyoxyalkylene groups are prepared by transesterifying polyacrylic esters obtained by free-radical polymerization in the presence of transesterification catalysts known per se such as sodium methoxide, methanesulfonic acid or trifluoroacetic acid. Disadvantages of this process are the high temperatures of 70-160° C., preferably of 110-150° C., which is why thermally labile compounds cannot be used.

WO 2004/042069 relates to a process for preparing radiation-curable and/or dual-curable poly(meth)acrylates. In this process, polymers are prepared by polymerizing at least one (meth)acrylate (component A) and at least one hydroxyalkyl (meth)acrylate (component B). In the ester function, component B has an alkyl radical which is in turn substituted by hydroxyl. This hydroxyl-functional side chain (stemming from component B) is reacted again in the resulting polymer by transesterification or esterification with (meth)acrylate or (meth)acrylic acid. This reaction takes place in the presence of an enzyme catalyzing the transesterification or esterification, especially in the presence of lipases, esterases or proteases.

In the literature, there are further examples for the enzymatic esterification or transesterification of acid groups in polymers. For instance, US-A 2004/0082023 relates to a process in which, in the presence of an enzyme, preferably of a lipase, a polymer which has at least one carboxyl group is esterified with an alcohol. Specific examples include the esterification of poly-L-glutaric acid, or of DL-polyaspartic acid with glycerol in the presence of the enzyme Novozym-435. Also described are the reaction of polyacrylic acid with ethylene glycol and also glycerol. With regard to this reaction, it is notable that it proceeds only to a very low degree, irrespective of whether an enzyme is present or not. However, US-A 2004/0082023 does not disclose that the presence of enzymes might have an influence on the modification of poly(meth)acrylates. However, comparative experiments carried out by applicant show that the presence of enzymes in the esterification of acid groups bonded directly to the polymer backbone leads to a low conversion.

K. Pavel et al. Makromol. Chem. 194, 3369-3376 (1993) describe the lipase-catalyzed esterification of carboxyl end groups of methacrylic acid and oligomers with isopropyl alcohol. The lipase used is a lipase from *Candida cylindracea*. Alternatively, the (α-(11-methacrylolylaminoundecanoyl)-ω-hydroxyoligo(oxyundecamethylenecarbonyl) monomer used can also be polymerized in the presence of styrene or further copolymers and the resulting polymer esterified with the same lipase. In the resulting polymers, the esterification takes place in a side chain of the polymer backbone, in the course of which the side chain having both an amide bond and several ester bonds is degraded partly by virtue of the presence of the lipase, i.e., instead of an esterification of the polymer, partial degradation of the parent monomer unit of the polymer took place. The process described by K. Pavel et. al. thus has the disadvantage that very nonuniform products are prepared with it.

P. lnprakhon et al., Designed Monomers and Polymers, (2001), 4, pages 95-106 describe the lipase-catalyzed transesterification of oligomethyl acrylates with cinnamyl alcohol using a lipase from *Rhizomucor miehei*. However, the transesterification proceeds only regioselectively at the end groups of the oligomer. Ester groups of the methacrylic acid unit which are not at the end of the oligomer but rather on its backbone were, however, not modified. Analogous results are described in T. Lalot et al., Polymer Bulletin 26, pages 55-62 (1991), where only the end groups of oligomethyl acrylates are transesterified by allyl alcohol in the presence of lipozymes. R. Kumar et al., Chem. Commun., 2004, pages 862-863 describe the enzyme-catalyzed esterification of polyethylenediglycolic acid with 4-hydroxymethylphenol to give the polymer esterified on a terminal acid group.

The object on which the present invention is based consists in the provision of an alternative process for modifying poly (meth)acrylates. According to the invention, this object is achieved by a process for esterifying or transesterifying side chains in polymers, comprising the following steps a) preparing a copolymer obtainable by polymerization of
   aa) at least one (meth)acrylate of the general formula (I) as component A,

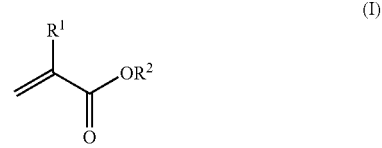

(I)

in which
R$^1$ is H or CH$_3$, and
R$^2$ is H or an alkyl radical which is optionally substituted by functional groups such as acryloyl, ether, amino, epoxy, halogen or sulfonic acid groups, and
   ab) at least one monomer of the general formula (II) as component B,

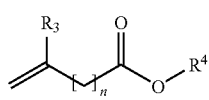

in which
R³ is as defined for R¹,
R⁴ is as defined for R², and n=from 1 to 40,
and
b) esterifying or transesterifying the carboxyl group having the R⁴ radical with an alcohol in the presence of an enzyme which catalyzes the esterification or transesterification.

In the context of the present invention, the term "(meth)acrylic acid" is used as an abbreviation of "methacrylic acid or acrylic acid"; correspondingly, the term "(meth)acrylate" is used as an abbreviation of "methacrylate or acrylate". The same applies mutatis mutandis to the polymers formed therefrom, which are referred to as "poly(meth)acrylates". In the context of the present invention, "poly(meth)acrylates" are understood to mean polymers or copolymers which, as a monomer unit, comprise at least one monomer from the group of acrylic acid, methacrylic acid, acrylate or methacrylate as defined for component A. This means that the inventive copolymers obtainable by polymerization of, for example, acrylate with at least one further monomer according to component B, which does not fall within the above-detailed group (component A), are also comprised by this term. An example of such a monomer (component B) is butyl 10-undecenoate.

One advantage of the process according to the invention is that poly(meth)acrylates can be prepared or modified in a simple manner by introducing, in addition to component A, a further monomer unit in component B, in which the carboxyl group is not bonded to the olefin bond in α-position. The carboxyl group is thus not bonded directly to the polymer backbone. This monomer unit can be modified with an alcohol in a simple manner in the polymer, so that a transesterification or esterification of the polymer (obtained in step a) of the process according to the invention) takes place selectively with a high degree of conversion. In contrast to the processes described in the prior art, not just a modification of the end groups of the polymer, but in particular a modification of the polymer side chains in which the carboxyl group is bonded to the polymer backbone via an alkyl spacer takes place. It is particularly advantageous in this context that the introduction of the alkyl spacer allows the carboxyl groups stemming from component B to be transesterified or esterified with high conversions.

A further advantage of the process according to the invention, especially over the process described in K. Pavel et al., can be considered to be that of no degradation proceeding in the side chains. Instead, the process according to the invention enables stable modification of the side chains. It is also advantageous that the process according to the invention takes place within short reaction times of from 2 to 48 hours.

Since the alcohol used in step b) in the process according to the invention is variable, it is also possible in this way to introduce further functional groups into the polymer prepared in step a), which makes possible another modification of the polymer prepared in step b).

The process according to the invention thus makes available novel poly(meth)acrylates modified with alcohols.

Step a)

Step a) comprises the preparation of a copolymer obtainable by polymerization of at least one component A, at least one component B and, if appropriate, one or more components C. Component A is (at least) one (meth)acrylate of the general formula (I),

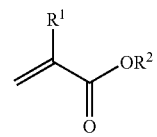

in which
R¹ is H or CH₃, and
R² is H or an alkyl radical which is optionally substituted by functional groups such as acryloyl, ether, amino, epoxy, halogen or sulfonic acid groups.

In step a), preference is given to using one monomer of the general formula (I) as component A. Component A is preferably a $C_1$-$C_6$-alkyl acrylate or a $C_1$-$C_6$-alkyl methacrylate, methacrylic acid or acrylic acid. Component A is more preferably acrylic acid, methacrylic acid, methyl acrylate, ethyl acrylate or butyl acrylate.

The component B used in the process according to the invention in step a) is (at least) one monomer of the general formula (II)

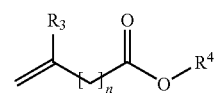

in which
R³ is as defined for R¹,
R⁴ is as defined for R², and n=from 1 to 40.

In step a), preference is given to using one monomer of the general formula (II). Preferred as component B are monomers in which R³=H or CH₃, n=from 2 to 8 and R⁴=$C_1$-$C_4$-alkyl. Particular preference is given as component B to monomers in which R³=H, n=from 2 to 8 and R⁴=$C_1$-$C_4$-alkyl, in particular butyl 10-undecenoate or ethyl 4-pentenoate.

If appropriate, in step a), (at least) one further monomer as component C may be copolymerized with components A and B. Suitable components C are in principle all monomers which are copolymerizable with the monomers of the general formulae (I) and (II). When component C is present, preference is given to copolymerizing a further monomer as component C. Preferably, as components C, a monomer is selected from the group consisting of styrene, acrylonitrile, vinyl acetate, vinyl propionate, vinyl chloride, vinylidene chloride, itaconic acid, maleic acid, fumaric acid, crotonic acid and the amides of the acids mentioned. Component C is more preferably selected from styrene, acrylonitrile, vinyl acetate, vinyl propionate, vinyl chloride or vinylidene chloride.

Unless stated otherwise, the term alkyl radical, for example for the substituents R² or R⁴, means a $C_1$-$C_{30}$-alkyl radical which may be either linear or branched, or else cyclic. Alkyl radicals which have both a cyclic and a linear component also fall under this definition. It is preferably a $C_1$-$C_{18}$-alkyl radical, more preferably a $C_1$-$C_8$-alkyl radical, particularly preferably a $C_1$-$C_4$-alkyl radical. If appropriate, the alkyl radicals may also be mono- or polysubstituted by functional groups such as acryloyl, ether, amino, epoxy, halogen or sulfonic acid groups. Examples of alkyl radicals are: methyl, ethyl, n-propyl, isopropyl, n-butyl, isobutyl, 2-ethylhexyl, tert-butyl, cyclohexyl, tert-butylcyclohexyl, isobornyl or trimethylcyclohexyl.

In a preferred embodiment of the process according to the invention, in step a), from 10 to 90% by weight, preferably from 20 to 80% by weight, more preferably from 40 to 70% by weight of component A, from 10 to 90% by weight, preferably from 20 to 70% by weight, more preferably from 30 to 60% by weight of component B, and from 0 to 50% by weight, preferably from 0 to 40% by weight, more preferably from 0 to 25% by weight of component C are used.

Poly(meth)acrylates which have carboxyl groups in the side chain and are prepared in step a) can be prepared by various processes known to those skilled in the art. Preference is given to the preparation by free-radical polymerization.

The polymerization is effected generally by emulsion, solution or bulk polymerization, preference being given to solution polymerization.

In one embodiment, the poly(meth)acrylates having carboxyl groups in the side chains are prepared in step a) by emulsion polymerization. In the emulsion polymerization, components A, B and, if appropriate, C are reacted with one another in the presence of water, emulsifiers, initiators and, if appropriate, regulators.

The emulsifiers used are generally anionic, nonionic, cationic or amphoteric emulsifiers, preference being given to anionic or nonionic emulsifiers. Suitable anionic emulsifiers are sodium, potassium or ammonium salts of long-chain carboxylic acids and sulfonic acids, alkali metal $C_{12-16}$-alkylsulfates, oxyethylated and sulfated or sulfonated long-chain aliphatic alcohols or alkylphenols, and sulfodicarboxylic esters. Suitable nonionic emulsifiers are oxyethylated fatty alcohols and alkylphenols, in which the ethylene oxide units may be between 2 and 50 mol/mol. Suitable cationic emulsifiers are ammonium, phosphonium and sulfonium compounds which comprise at least one long aliphatic hydrocarbon chain as a hydrophobic molecular moiety. It is also possible to use a combination of different emulsifiers, for example of ionic and nonionic emulsifiers.

The water used is preferably distilled or demineralized, since salts can impair the emulsion stability. In general, the polymerization process is carried out under nitrogen, since oxygen inhibits the polymerization.

The molecular weight of the poly(meth)acrylates prepared in step a) can be lowered by addition of regulators. Suitable regulators are, for example, halogenated compounds such as carbon tetrachloride, carbon tetrabromide, bromal, benzyl bromide and trichlorobromomethane, or mercaptans such as butyl mercaptan or dodecyl mercaptan, or Rongalit® C.

Suitable initiators are generally all initiators known to those skilled in the art for the polymerization of (meth)acrylates. In general, water-soluble peroxo compounds such as alkali metal or ammonium persulfate, hydrogen peroxide or tert-butyl peroxy-ethylhexanoate are used. Additionally suitable are redox systems such as $H_2O_2$-ascorbic acid, $H_2O_2$—Fe(II)/Fe(III), $H_2O_2$—Ce(IV), persulfites-Fe, metabisulfites-Fe or hydroperoxides-metal salts. The initiators are used generally in an amount of from 0.05 to 8% by weight, preferably from 0.2 to 2% by weight, based on the amount of the monomers used.

Any initiator still present after the polymerization can be deactivated after the polymerization in order to prevent possible polymerization of the poly(meth)acrylates prepared in accordance with the invention in step b). The deactivation is effected generally by addition of a reducing agent, for example ascorbic acid.

The polymerization is carried out generally in a temperature range of from 30 to 120° C., preferably from 40 to 110° C., more preferably from 50 to 90° C. The polymerization is carried out generally at a pressure of from 1 to 20 bar, preferably from 1 to 15 bar, more preferably from 1 to 5 bar.

The emulsifiers are used generally in an amount of from 0.5 to 15% by weight, preferably from 0.5 to 10% by weight, more preferably from 0.5 to 5% by weight, based on the amount of the components A, B and, if appropriate, C used.

The particle diameter of the poly(meth)acrylates obtained by polymerization is generally from 20 to 1000 nm, preferably from 20 to 500 nm, more preferably from 50 to 400 nm, determined by means of light scattering.

In the emulsion polymerization, the pH is generally between 1 and 6, preferably between 2 and 6. The hydroxyl numbers are generally from at least 20 to 180, preferably from at least 40 to 120. The solids content of the dispersions is generally from 10 to 50, preferably from 20 to 40, and the glass transition temperature of the resulting polymers is generally between −40 and +80° C.

In a further preferred embodiment, the poly(meth)acrylates having carboxyl groups in the side chains are prepared in step a) by solution polymerization. In the solution polymerization, components A, B and, if appropriate, C are reacted with one another in the presence of solvent, initiator and, if appropriate, regulators.

Such solution polymerization processes are known. They typically take place in inert organic solvents in which the polymers formed are soluble and may, after the polymerization has ended, frequently be present therein in amounts of over 10% by weight. The reactions typically take place in the presence of free radical-forming polymerization initiators. It is also possible to use chain transferers.

It is also possible to use protective colloids. These may be present, for example, in the range from 0.05 to 4% by weight based on the monomers used in the polymerization. When the protective colloids used are polymers of $C_1$- to $C_{12}$-alkyl vinyl ethers, they preferably have K values of from 10 to 200 (measured according to H. Fikentscher in cyclohexanone at a polymerization concentration of 1% by weight and 25° C.).

The organic solvents used are typically inert organic solvents, as known in the prior art for the preparation of the abovementioned compounds.

For example, aromatic solvents such as benzene, toluene, o-xylene, m-xylene, p-xylene, ethylbenzene, cumene and mixtures of the aromatic solvents mentioned are used in a suitable ratio. In practice, especially the mixtures of aromatics customary in industry have significance, for example mixtures of the xylenes.

Preference is given to solvents which are not disruptive to an enzymatic reaction in step b), so that removal of the solvent before the performance of step b) is not required. More preferably, solvents selected from toluene, cyclohexane, 1,3-dioxane, methyl isobutyl ether, ionic liquids, tert-butanol, methyl isobutyl ketone, acetone, xylene, N-methylpyrrolidone, methyl ethyl ketone, methyl propyl ketone, methyl amyl ketone and Solvent Naphtha are used. Preference is given to selecting the solvent such that it corresponds approximately to the polarity of the polymer to be prepared (in step a)).

Monomers A and B and, if appropriate, further monomers are copolymerized typically in the presence of free radical-forming polymerization initiators. Initiators suitable for the preparation are known, for example, from EP-B 0 106 991.

They are used typically in amounts of from 0.01 to 20% by weight, preferably from 0.05 to 10% by weight, based on the monomers used in the polymerization. The copolymerization can also be carried out by the action of ultraviolet light, if appropriate in the presence of UV initiators. Such initiators are, for example, compounds such as benzoin and benzoin ether, α-methylbenzoin or α-phenylbenzoin. It is also possible to use so-called triplet sensitizers such as benzyl diketals. The UV radiation sources used are, for example, in addition to energy-rich UV lamps such as carbon arc lamps, mercury vapor lamps or xenon lamps, also low-UV light sources such as fluorescent tubes with a high blue fraction.

Initiators suitable with preference for the solution polymerization are peroxides such as dialkyl peroxides, for example di-tert-butyl peroxide and di-tert-amyl peroxide, peroxy esters such as tert-butyl peroxy-2-ethyl hexanoate and tert-amyl peroxy-2-ethylhexanoate, diacyl peroxides such as benzoyl peroxide, lauroyl peroxide and decanoyl peroxide, percarbonates such as tert-butyl peroxyisopropylcarbonate, di-2-ethylhexyl peroxydicarbonate, perketals and ketone peroxides, and also azo initiators such as 2,2'-azobis(2,4-dimethylpentanenitrile), 2,2'-azobis(2-methylpropanonitrile), 2,2'-azobis(2-methylbutanonitrile), 1,1'-azobis(cyclohexanecarbonitrile), 2,2'-azobis-(2,4,4-trimethylpentane), 2-phenylazo-2,4-dimethyl-4-methoxyvaleronitrile and 2,2'-azobis (isobutyronitrile) [AIBN], which is commercially available, for example, under the trade name Porofor N.

When the copolymers are intended to have a low K value, the copolymerization is appropriately carried out in the presence of regulators. Suitable regulators are, for example, mercapto compounds, such as mercaptoethanol, mercaptopropanol, mercaptobutanol, mercaptoacetic acid, mercaptopropionic acid, butyl mercaptan and dodecyl mercaptan. Suitable regulators are also allyl compounds such as allyl alcohol, aldehydes such as formaldehyde, acetaldehyde, propionaldehyde, n-butyraldehyde and isobutyraldehyde, formic acid, ammonium formate, propionic acid and butenols. If the copolymerization is carried out in the presence of regulators, generally from 0.05 to 20% by weight thereof is required, based on the monomers used in the polymerization.

Suitable protective colloids are polyalkyl vinyl ethers having from 1 to 12 carbon atoms in the alkyl radical. The K values of the polyalkyl vinyl ethers are typically from 10 to 200, preferably from 20 to 100 (measured in 1% solution in cyclohexanone at 25° C.).

Suitable polyalkyl vinyl ethers are, for example, polymethyl vinyl ether, polyethyl vinyl ether, polypropyl vinyl ether, polyisopropyl vinyl ether, polybutyl vinyl ether, polyisobutyl vinyl ether and polyhydroxybutyl vinyl ether, and also mixtures of the polyalkyl vinyl ethers mentioned. The protective colloid used is preferably polyethyl vinyl ether. The amount of protective colloid added is typically from 0.05 to 4% by weight, preferably from 0.1 to 2% by weight, based on the monomers used in each case in the polymerization.

The polymerization is effected typically at temperatures of from 30° C. to 200° C., preferably from 50° C. to 160° C. Relatively low polymerization temperatures are used to prepare lightly crosslinked and high molecular weight copolymers, while high polymerization temperatures are selected to prepare polymers with low K values. The molecular weights also depend upon the amount of the polymerization initiators used in each case. The copolymerization can be carried out at standard pressure, at reduced pressure and, if appropriate, under elevated pressure, for example at pressures of from 1 to 200 bar; preference is given to carrying out the copolymerization at standard pressure.

In order to prepare lightly crosslinked and particularly high molecular weight copolymers, the organic solvent, any protective colloid present and the monomers are initially charged in the reactor and polymerized in a nitrogen stream at the desired polymerization temperature by slow continuous addition in portions of the initiator. The initiator is metered in such a way that the heat of reaction formed can be removed in a controlled manner. The polymer can be obtained as a suspension in the form of fine particles and be isolated as a powder by drying or remain in solution (precipitation or solution polymerization).

In order to prepare medium and low molecular weight copolymers, the solvent, any protective colloid present and the monomer as per component B are initially charged in the reactor and heated to the desired polymerization temperature in a nitrogen stream, and then the monomer as per component A and, if appropriate, the monomer as per component C are added continuously or in portions over a prolonged period, preferably within from 2 to 8 hours. After the end of the copolymerization, the polymer can be separated from the organic solvent.

The poly(meth)acrylates obtained in step a) generally have a mean molecular weight of from 1000 to 1 000 000, preferably from 5000 to 500 000, more preferably from 10 000 to 200 000. The mean molecular weight was determined by means of gel permeation chromatography (GPC). This is the weight-average molecular weight ($M_w$).

The preparation of the poly(meth)acrylates in step a) is possible by means of one-pot or batchwise processes, feed processes and continuous methods. The performance of the methods mentioned is known to those skilled in the art.

The poly(meth)acrylate which has carboxyl groups in the side chains and is obtained in step a) can be isolated by methods known to those skilled in the art. One example of a method is described in EP-A 0 029 637.

Step b)

The copolymers prepared in step a) are subsequently subjected in step b) to a transesterification or esterification with an alcohol in the presence of an enzyme catalyzing the transesterification or esterification. This transesterifies or esterifies predominantly the carboxyl groups having the $R^4$ radical. The carboxyl groups stemming from component A are, in contrast, transesterified or esterified only to a very small extent, if at all. Step b) can, if appropriate, be carried out in the presence of a stabilizer.

Suitable alcohols are in principle all alcohols; preference is given to using one alcohol, but it is possible, if appropriate, to use two or more alcohols in the form of a mixture. The alcohol is preferably selected from sugar, thio alcohol, amino alcohol, unsaturated alcohols, saturated aliphatic alcohols or polyols. Examples of sugars are glucose, sucrose, sorbitol or methylglucocide. Suitable thio alcohols are in principle all compounds which have both a hydroxyl substituent and a mercapto substituent. Preferred thio alcohols have the chemical formula: HO—($C_1$-$C_8$-alkyl)-SH, especially mercaptoethanol. Suitable amino alcohols are in principle all compounds which have a hydroxyl substituent and an amino substituent. Useful amino substituents are in particular —$NH_2$, —NH ($C_1$-$C_6$-alkyl) and —N($C_1$-$C_6$-alkyl)$_2$, where the amino substituents may in turn optionally be at least monosubstituted, for example by at least one substituent from the group of —COOH, —$SO_3H$, —$PO_3H_2$, —$CH_2COOH$ and —$CH_2N$ ($CH_2COOH)_2$. Preferred amino alcohols are compounds of the general formula (III),

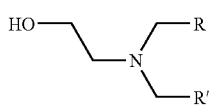

formula (III)

in which
1. R=R'=COOH, SO$_3$H, PO$_3$H$_2$ or H or
2. R=CH$_2$COOH, R'=CH$_2$N(CH$_2$COOH)$_2$.

Particularly preferred amino alcohols are aminoethanol and dimethylaminoethanol. Suitable unsaturated alcohols are, for example, propargyl alcohol and allyl alcohol; aromatic alcohols such as phenol are also suitable in principle. Saturated aliphatic alcohols are compounds which have a C$_1$-C$_{30}$-alkyl chain and a hydroxyl substituent. Preference is given in this context to C$_8$-C$_{18}$-alkyl alcohols, especially lauryl alcohol. Suitable polyols are in principle all compounds which have at least two hydroxyl substituents. In the context of the present compound, the term polyols shall also be understood to encompass compounds as defined in EP-A 386 507, i.e. those compounds which comprise (CH$_2$—CH$_2$—O—)$_n$ fragments. Preferred polyols are butanediol, ethylene glycol or glycerol.

In one embodiment of the present invention, the alcohols used in step b) are sugar, thio alcohols, amino alcohols or polyols.

In a preferred embodiment of the present invention, thio alcohols or amino alcohols are used in step b). The alcohol used in step b) is more preferably mercapto ethanol, dimethylamino alcohol or lauryl alcohol.

In a further embodiment of the present invention, saturated aliphatic alcohols are used in step b), preferably C$_8$-C$_{30}$-alkyl alcohols.

In this further embodiment of the present invention, preference is given to using C$_8$-C$_{18}$-alkyl alcohols in step b), more preferably lauryl alcohol.

In a further preferred embodiment of the present invention, alcohols are used in step b) which, apart from a hydroxyl substituent, have at least one further functional group. This functional group is preferably a thio group, amino group, or a further hydroxyl group.

The enzymes catalyzing the esterification or transesterification used are preferably hydrolases. In the context of the present invention, hydrolases are enzymes which cleave the substances hydrolytically in reversible reaction. The reaction catalyzed by the hydrolases is also classified by the EC number (enzyme commission number) EC 3.X.X.X. Suitable hydrolases are known to those skilled in the art, for example amidases, amylases, carboxypeptidases, chymotrypsin, deoxyribonuclease, esterases, glycosidases, hemicellulases, lactases, peptidases, trypsin, ureases, lipases or proteases. Enzymes which catalyze the esterification or transesterification, such as the aforementioned hydrolases, and are particularly suitable for use in the process according to the invention can be identified by enzyme screening as described in Example 1. In the screening process according to Example 1, suitable hydrolases convert more than 0%, preferably more than 10%, more than 20%, more than 30%, more than 40%, more than 50% or more than 60% of substrate.

In particular, the hydrolases may be selected from the group consisting of lipases (EC 3.1.1.3), esterases (EC 3.1.X.X), glycosylases (EC 3.2.X.X) and proteases (EC 3.4.X.X). More preferred as the enzyme is a lipase from fraction B of *Candida antarctica*, from *Alcaligenes* species, from *Aspergillus* species, from *Mucor* species, from *Penicilinum* species, from *Geotricum* species, from *Rhizopus* species, from *Burkholderia* species, from *Burkholderia plantarii*, from *Candida* species, from *Pseudomonas* species, from *Thermomyces* species or from the *porcine* pancreas. Particular preference is given to lipases from fraction B of *Candida antarctica* or from *Burkholderia plantarii*.

Lipases from fraction B of *Candida antarctica* which can be used in the process according to the invention preferably have an amino acid sequence as deposited in one of the following Genbank accession numbers: gi:1085991, gi:1170790, gi:1311320, gi:576303, gi:576302, gi:576301, gi:576300, gi:576299 or gi:515792. Lipases from *Burkholderia* species which can be used in the process according to the invention preferably have an amino acid sequence as deposited in one of the following Genbank accession numbers: gi:76583779, gi:69989725, gi:67763516, gi:67754522, gi:67711158, gi:67682447, gi:67662116, gi:67651564, gi:67647896, gi:67641733, gi:67632700, gi:67545107, gi:67533555, gi:67464317, gi:67464316, gi:6710422, gi:46314081, gi:3660419, gi:2194041 or gi:576295. The Genbank database is obtainable from NCBI, USA (http://www.ncbi.ulm.nih.gov/entrez/query.fcgi). Further preferred lipases are mentioned in Example 1 and can be obtained by processes known in the prior art.

The enzymes to be used in the processes according to the invention may be present in purified form or be used in the form of cell lysates. Processes for purifying enzymes are known to those skilled in the art and comprise, for example, chromatographic techniques and the use of specific antibodies. Cell lysates can be obtained from cultures of the aforementioned microorganisms by disruption of the cell membranes.

The enzymes may be used in free form or immobilized form on a support, to which they are chemically or physically bonded. The amount of the enzyme catalyst is preferably from 0.1 to 20% by weight, more preferably from 1 to 10% by weight based on the amount of carboxyl groups to be esterified or transesterified in the copolymers prepared in step a).

The enzymatic esterification or transesterification with an alcohol is effected generally at low temperatures, preferably from 20 to 100° C., more preferably from 40 to 80° C. The reaction conditions in the enzymatic esterifications or transesterifications are mild. Owing to the low reaction temperatures and other mild conditions, the formation of by-products in step b) is prevented, which otherwise originate, for example, in the use of chemical catalysts (as detailed in EP-A 386 507).

For the enzymatic reaction (step b)), the product from step a) can generally be used without further pretreatment. When, however, water has been used as a solvent in step a), the water should substantially be removed before the enzymatic reaction in step b). If required, the product prepared in step a) may be freed of volatile substances (for example solvents) or additional substances (for example solvents) may be added. The product to be obtained in step a) should be substantially free of free-radical initiators or be low in free radical initiators which might damage the enzyme oxidatively.

The reaction time depends upon factors including the amount used and the activity of the enzyme catalyst and the desired degree of reaction, and also on the type of carboxyl groups present in the side chains.

The alcohol used for the esterification or transesterification is used generally in equimolar amounts or in an excess in relation to the number of carboxyl groups having R$^4$ radical present in the copolymer. Preference is given to a molar ratio of alcohol to carboxyl groups of from 1:1 to 10:1. Higher excesses are not disruptive. More preferably, the ratio is from 2 to 4:1, in particular 3:1.

In general, in step b), at least 10%, preferably at least 20%, more preferably at least 40% of all carboxyl groups having an $R^4$ radical are esterified or transesterified.

Suitable stabilizers used if appropriate are selected from the group consisting of 2,6-dibutylphenols such as di-tert-butylphenol, p-cresol, hydroquinone, hydroquinone monomethyl ether, dimethylhydroquinone or phenothiazines. However, it is also possible to carry out step b) without use of stabilizers.

The reaction can be carried out in all reactors suitable for such a reaction. Such reactors are known to those skilled in the art. Preference is given to effecting the reaction in a stirred tank reactor, a fixed bed reactor or a Taylor reactor.

The water of reaction formed during the esterification or transesterification or the alcohol formed may be removed by methods known to those skilled in the art, for example by absorption (for example with molecular sieve), distillation or pervaporation.

The reaction is carried out until the desired conversion of generally from 5 to 100% has been attained. In a reaction with simultaneous removal of the alcohol or water formed during the reaction, higher conversions can be achieved within shorter reaction times owing to the shifting of the reaction equilibrium.

After the reaction, the enzyme catalyst can be removed by suitable measures, for example filtration or decanting, and be used repeatedly if appropriate.

Step b) can, if appropriate, be carried out in the presence of a solvent. The selection of a suitable solvent depends very greatly upon the solubility of the polymer used. Examples of suitable solvents are toluene, tetrahydrofuran (THF), dioxane, tert-butanol, dimethyl sulfoxide (DMSO), acetone or ionic liquids. Mixtures of two or more aforementioned solvents are also suitable. If appropriate, it is also possible to dispense with a solvent when the alcohol of step b) to be esterified brings about the dissolution or partial dissolution of the polymer. The polymer is dissolved in the solvent to give a clear solution, emulsified, dispersed or only partly dissolved. The water content should be <10% by weight in order to suppress the hydrolysis of the products. The water content is preferably less than <2% by weight based on the amount of the polymer from step a) used.

The present invention further provides polymers preparable by the process detailed above. Preference is given in this context to polymers in which, in step b) of the above-described process, a further functional group has been introduced into the side chains of the fragments stemming from component B. In particular, the further functional group is an amino group, mercapto group or a further hydroxyl group. Preference is further given to polymers in which the degree of transesterification or esterification of the carboxyl group having the $R^4$ radical is 10%, preferably 20%, in particular 40%. In a further preferred embodiment, the inventive polymers are esterified with a $C_8$-$C_{18}$-alcohol, especially with lauryl alcohol. This degree of esterification is preferably 20%, in particular 40%.

The present invention further provides for the use of the inventive polymers as a fiber protectant in laundry detergents, as an incrustation inhibitor, for the complexation of metals, as a graying inhibitor, in corrosion protectants for passivating steel surfaces, in disperse dyes, in building chemicals, in adhesives, for paper production, as a dispersant, in dispersions, in lacquers and coatings or as a complexing agent. Depending on what kind of alcohol is used in step b) of the process according to the invention for transesterification or esterification, this has influences on the kind of use. Alcohols which additionally have a thiol group are particularly suitable as corrosion protectants, while alcohols which additionally have an amino group can be used particularly effectively as a laundry detergent additive.

The invention will be illustrated by the examples which follow.

EXAMPLES

Preparation of the Copolymers in Step a)

Copolymer 1

A 2 l pilot stirrer unit controlled by a process control system and having anchor stirrer, cooler and oil bath is purged with nitrogen and then initially charged with 200 g of toluene. Subsequently, it is heated to 85° C. 595.0 g of ethyl acrylate (70% by weight) are metered in via a first feed over 5.5 h. 260.2 g of butyl 10-undecenoate (30% by weight) were metered in via a second feed over 4 h. 2.55 g of Porofor N in 90 g of toluene (solids content: 2.7% Porofor N in toluene; 0.3% by weight overall) are metered in via a third feed over 6.5 h. As soon as the initial charge has been heated to 85° C., feeds 1 to 3 are, started simultaneously; after the end of the third feed, polymerization is continued for another hour.

The solids content of the resulting copolymer is 62.8% (determined at 120° C. over 2 h under reduced pressure). The copolymer is referred to hereinafter as poly(ethyl acrylate-co-butyl undecenoate).

Copolymer 2

Copolymer 2 is prepared mutatis mutandis to copolymer 1. In feed 1, however, butyl acrylate is used. The solids content of the resulting copolymer is 63.1% (determined at 120° C. under reduced pressure over 2 h). The copolymer is referred to hereinafter as poly(butyl acrylate-co-butyl undecenoate).

Copolymer 3

Copolymer 3 is prepared mutatis mutandis to copolymer 2. In feed 2, however, ethyl 4-pentenoate is used. The resulting copolymer has a solids content of 58.4% (determined under reduced pressure at 120° C. over 2 h). The copolymer is referred to hereinafter as poly(butyl acrylate-co-ethyl 4-pentenoate). $M_W$=64 000.

Copolymer 4

Copolymer 4 is prepared mutatis mutandis to copolymers 1 to 3. 595.0 g of ethyl acrylate are used in feed 1 and 138.67 g of ethyl 4-pentenoate in feed 2. The resulting copolymer has a solids content of 63.7% (determined under reduced pressure at 120° C. over 2 h). The copolymer is referred to hereinafter as poly(ethyl acrylate-co-ethyl 4-pentenoate).

Copolymer 5

Copolymer 5 is prepared mutatis mutandis to copolymer 4, except that 260.2 g of ethyl 4-pentenoate are used in feed 2. The resulting copolymer has an $M_W$ value of 67 000. The copolymer is referred to hereinafter as poly(ethyl acrylate-co-ethyl 4-pentenoate).

HPLC analysis for quantification of n-butanol and ethanol:

An "aminex fermentation monitoring" column (150×7.8 mm; Biorad) with a "cation H" precolumn is used. At 30° C. and a flow rate of 1.0 ml/min, 5.0 µl of sample are injected and eluted with 5 mM sulfuric acid solution. Ethanol elutes after 6.5 min and n-butanol after 11.0 min. For detection, an RI detector is used. For quantification, calibration curves with calibration solutions are produced.

Example 1

Enzyme screening for transesterification of poly(ethyl acrylate-co-butyl undecenoate)

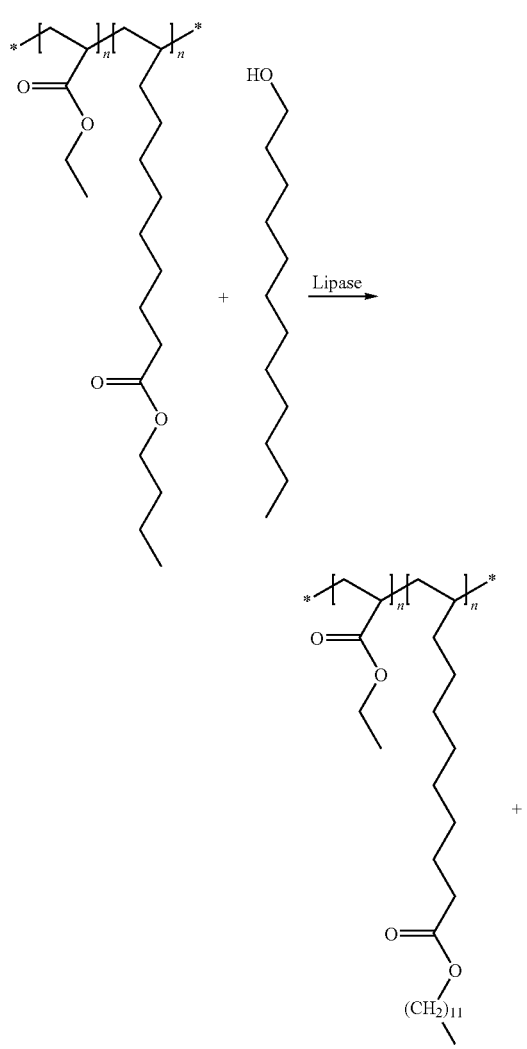

Scheme I 5.0 g of a toluenic solution of poly(ethyl acrylate-co-butyl undecenoate) (comprise 3.92 mmol of undecanoate) (calculated via solids content and percentage by weight of the monomers used) and 7.84 mmol of lauryl alcohol are agitated with 100 mg of enzyme preparation at 60° C. for 24 h. By means of HPLC, the amounts of butanol released are determined and the conversion is calculated.

| Enzyme | Butanol [mmol/l] | Conversion [%] |
|---|---|---|
| None | 0.0 | 0 |
| Novozym 435 | 312 | 57 |
| Lipase from *Rhizopus miehei* (Lipozym RM IM) | 292 | 54 |
| Lipase from *Pseudomonas fluorescens* | 23 | 4 |
| Lipase from *Thermomyces lanuginosa* (Lipozym TL IM) | 232 | 43 |
| Lipase from *Candida antarctica* A (Chirazym L-5) | 264 | 49 |
| Lipase from *Achromobacter* spp. (Lipase ALC) | 48 | 9 |
| Lipase from *Alcaligenes* spp. (Lipase QLC) | 120 | 22 |

Example 2

Enzyme screening for the transesterification of poly(butyl acrylate-co-ethyl pentenoate)

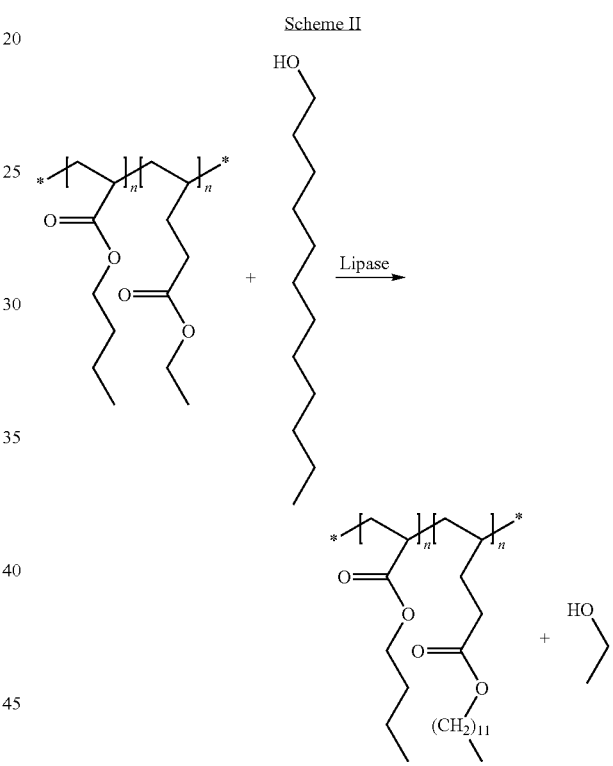

Scheme II 5.0 g of a toluenic solution of poly(butyl acrylate-co-ethyl pentenoate) (comprise 6.835 mmol of pentenoate) and 13.67 mmol of lauryl alcohol are agitated with 100 mg of enzyme preparation at 60° C. for 24 h. By means of HPLC, the amounts of ethanol released are determined and the conversion is calculated.

| Enzyme | Ethanol [mmol/l] | Conversion [%] |
|---|---|---|
| None | 0.0 | 0 |
| Lipozym RM IM | 371 | 47 |
| Lipase from *Pseudomonas fluorescens* | 28 | 4 |
| Lipozym TL IM | 98 | 12 |
| *Candida antarctica* A (C.F Chirazym L-5) | 357 | 45 |
| Lipase from *Achromobacter* spp. (Lipase ALC) | 53 | 7 |
| Lipase from *Alcaligenes* spp. (Lipase QLC) | 127 | 16 |

Example 3

Variation of substrate ratio for poly(butyl acrylate-co-butyl undecenoate)

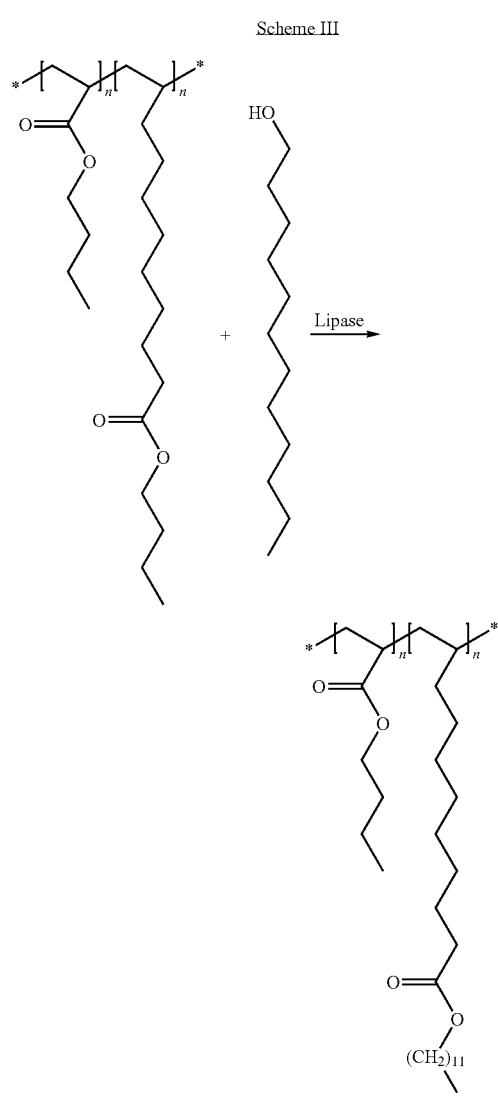

Scheme III 5.0 g of a toluenic solution of poly(butyl acrylate-co-butyl undecenoate) (comprise 3.94 mmol of undecenoate) and 3.94/7.88/11.81 mmol of lauryl alcohol are agitated with 100 mg of Novozym 435 at 60° C. for 24 h. By means of HPLC, the amounts of butanol released are determined and the conversion is calculated.

| Lauryl alcohol [mmol] | Lauryl alcohol molar excess | Butanol [mmol/l] | Conversion [%] |
|---|---|---|---|
| 3.94 | 1 | 357 | 66 |
| 7.88 | 2 | 333 | 54 |
| 11.81 | 3 | 345 | 71 |

Example 4

Mercaptoethanol with poly(ethyl acrylate-co-butyl 10-undecenoate)

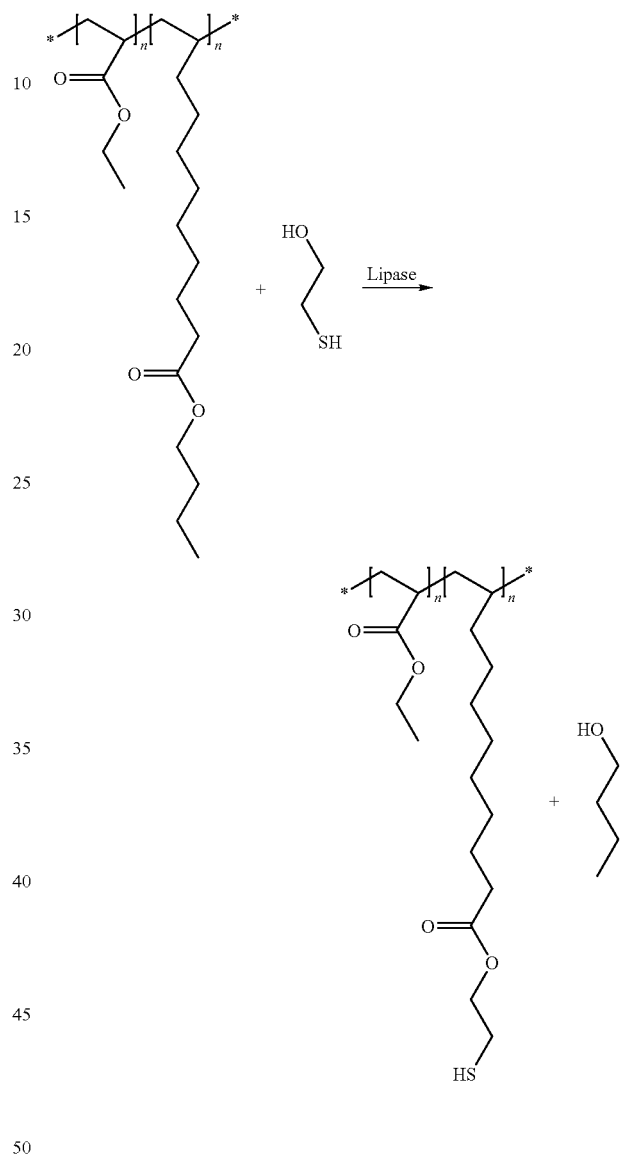

Scheme IV 5.0 g of a toluenic solution of poly(ethyl acrylate-co-butyl 10-undecenoate) (comprise 3.94 mmol of undecenoate) and 1.96/3.92/5.88 mmol of mercaptoethanol are agitated with 100 mg of Novozym 435 at 60° C. for 24 h under a nitrogen atmosphere. By means of HPLC, the amounts of butanol and ethanol released are determined. Very little ethanol is found. The conversion is calculated from the amount of butanol.

| Mercaptoethanol [mmol] | Mercaptoethanol excess | Ethanol [mmol/l] | Butanol [mmol/l] | Butanol conversion [%] |
|---|---|---|---|---|
| 1.959 | 1 | 31 | 190 | 30 |
| 3.919 | 2 | 33 | 199 | 33 |
| 5.878 | 3 | 44 | 180 | 32 |

Example 5

Dimethylaminoethanol with poly(ethyl acrylate-co-butyl 10-undecenoate)

Scheme V

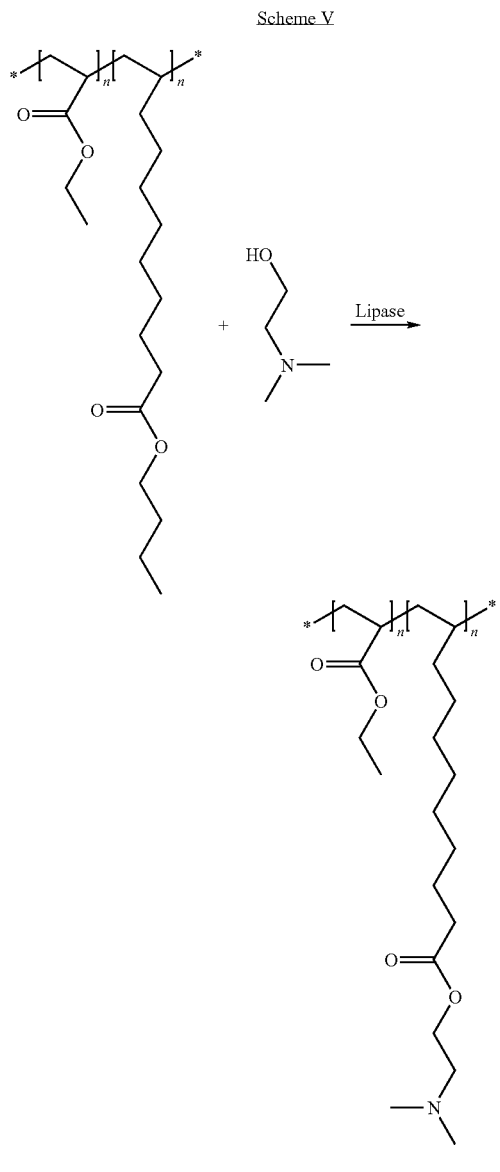

5.0 g of a toluenic solution of poly(ethyl acrylate-co-butyl 10-undecenoate) (comprise 3.92 mmol of undecenoate) and 3.92/7.84/11.76 mmol of dimethylaminoethanol (DMAE) are agitated with 100 mg of Novozym 435 at 60° C. for 24 h. By means of HPLC, the amounts of butanol and ethanol released are determined. Very little ethanol is found. The conversion is calculated from the amount of butanol.

| DMAE [mmol] | DMAE excess | Ethanol [mmol/l] | Butanol [mmol/l] | Butanol conversion [%] |
|---|---|---|---|---|
| 3.919 | 1 | 42 | 213 | 34 |
| 7.837 | 2 | 55 | 288 | 49 |
| 11.756 | 3 | 34 | 254 | 46 |

Example 6

Control reactions with poly(butyl acrylate-co-ethyl pentenoate)

Scheme VI

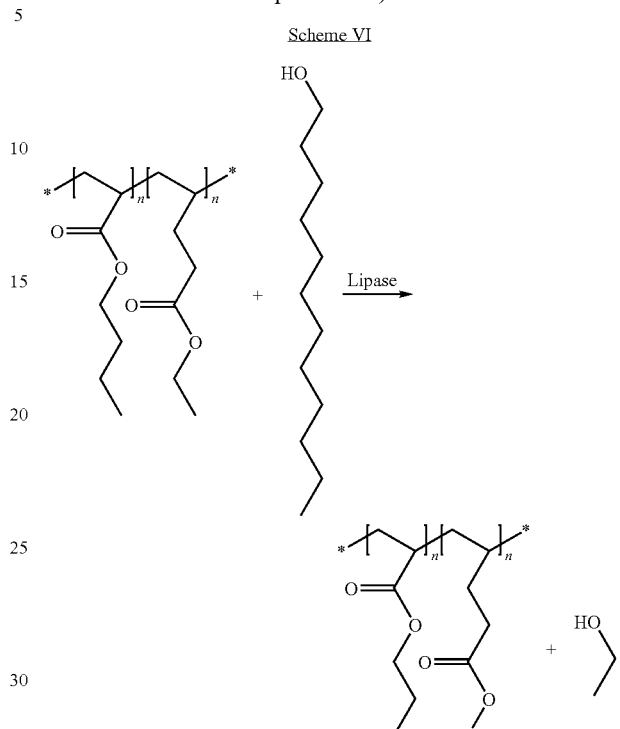

5.0 g of a toluenic solution of poly(butyl acrylate-co-ethyl pentenoate) (comprise 6.76 mmol of pentenoate) and 20.27 mmol of lauryl alcohol are agitated with 100/200 mg of Novozym 435 at 60° C. for 24 h. By means of HPLC, the amounts of butanol and ethanol released are determined. The conversion is calculated from the amount of butanol.

| Conditions/Changes | Butanol [mmol/l] | Ethanol [mmol/l] | Ethanol conversion [%] |
|---|---|---|---|
| Without enzyme | 6.5 | 5 | 1 |
| Without lauryl alcohol | 0 | 45 | 4 |
| Without polymer | 0 | 0 | 0 |
| Example 6 without changes | 66 | 398 | 61 |

The comparative examples A) and B) which follow are carried out according to US 2004-0082023.

Comparative Example A

In a 100 ml round-bottom flask, polyacrylic acid (7.2 g of 100 mmol of acid groups) and ethylene glycol (18.6 g or 300 mmol) are stirred at 85° C. for 20 min. After addition of 2.58 g of Novozym, the mixture is stirred at 85° C. for a further 24 h. Vacuum is applied at intervals in order to remove the water formed.

After cooling, the mixture is dissolved in methanol and the supported enzyme is filtered off. The product is precipitated in ethyl acetate and the conversion is analyzed by means of $^1$H NMR in $D_2O$ or DMSO (dimethyl sulfoxide) analogously to US 2004-0082023.

| Conditions | Conversion [%] |
| --- | --- |
| Novozym 435 | 13 |
| Without enzyme | 22 |

Comparative Example B

In a 100 ml round-bottom flask, one part by weight of polyacrylic acid and from three to 10 parts by weight of ethylene glycol are stirred at 85° C. for 20 min. After addition of 0.1 part by weight of Novozym 435, the mixture is stirred at 85° C. for a further 24 h. Vacuum is applied at intervals in order to remove the water formed.

After cooling, the mixture is dissolved in methanol, the supported enzyme is filtered off and the methanol is removed on a rotary evaporator. The conversion is determined by means of $^1$H NMR analogously to US 2004-0082023.

| Novozym 435 | Equivalents of ethylene glycol | Time [h] | Conversion [%] |
| --- | --- | --- | --- |
| — | 3 | 24 | 16 |
| — | 3 | 24 | 17 |
| 10 wt % | 3 | 24 | 9 |
| 10 wt % | 3 | 31 | 10 |
| 20 wt % | 3 | 24 | 10 |
| 10 wt % | 5 | 24 | 9 |
| 10 wt % | 10 | 24 | 6 |

The examples above show clearly what effect the use of an enzyme has in the esterification or transesterification of side chains in polymers with alcohols. The comparative examples indicate that the use of an enzyme in the esterification or transesterification of acid groups bonded directly to the polymer backbone in polyacrylic acid leads to no improvements whatsoever (the conversion is actually lower). When, in contrast, acid groups of polymers which, in accordance with the process according to the invention, are not bonded directly to the polymer backbone are esterified or transesterified, the use of an enzyme brings about a distinct increase in conversion. Especially from Examples 2 and 6, it becomes evident that a transesterification takes place to a very small degree even in the absence of an enzyme. However, as soon as an enzyme is used, the acid groups not bonded directly to the polymer backwheel are transesterified selectively (at a distinctly increased conversion).

Regarding Schemes I to VI, it should be noted that this is an idealized illustration of the transesterification process of the particular polymer. The copolymer depicted on the right-hand side of the particular scheme (transesterification product) is depicted for an idealized, 100% conversion. However, as is evident from the comparative examples, the conversion generally does not take place to an extent of 100%, so that the particular polymer also has those units as depicted on the left-hand side of the particular scheme for the corresponding starting copolymer before the transesterification.

What is claimed is:

1. A process for esterifying or transesterifying a side chain in a polymer, the process comprising:
    (i) preparing a copolymer obtained by polymerizing monomers comprising
    (A) at least one (meth)acrylate of formula (I),

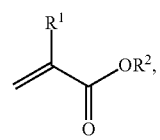

(I)

and
    (B) at least one monomer of formula (II),

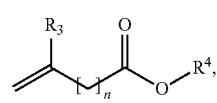

(II)

wherein
$R^1$ and $R^3$ are independently H or $CH_3$,
$R^2$ and $R^4$ are independently H or an alkyl radical which is optionally substituted by a functional group
and
n is from 1 to 40, and
    (ii) esterifying or transesterifying the carboxyl group having the $R^4$ radical with an alcohol in the presence of an enzyme which catalyzes the esterifying or transesterifying.

2. The process of claim 1, wherein the alcohol in the esterifying or transesterifying (ii) is at least one selected from the group consisting of a sugar, a thio alcohol, an amino alcohol, an unsaturated alcohol, a saturated aliphatic alcohol, and a polyol.

3. The process of claim 1, wherein the enzyme is a lipase from
    fraction B of *Candida antarctica*,
    *Alcaligenes species*,
    *Aspergillus species*,
    *Mucor species*,
    *Penicilinum species*,
    *Geotricum species*,
    *Rhizopus species*,
    *Burkholderia species*,
    *Burkholderia plantarii*,
    *Candida species*,
    *Pseudomonas species*,
    *Thermomyces species* or
    the porcine pancreas.

4. The process of claim 1, wherein more than 40% of the $R^4$ radical is esterified or transesterified with the alcohol in the esterifying or transesterifying (ii).

5. The process of claim 1, wherein the copolymer further comprises, in reacted form,
    (C) at least one monomer, which is copolymerizable with the monomers of formulas (I) and (II).

6. The process of claim 1, wherein at least one of (i), (ii), (iii), and (iv) are true:
    (i) the component (A) is a $C_1$-$C_6$-alkyl acrylate, $C_1$-$C_6$-alkyl methacrylate, methacrylic acid, or acrylic acid;
    (ii) in component (B), n is from 2 to 8 and $R^4$ is $C_1$-$C_4$-alkyl;
    (iii) the alcohol is mercaptoethanol or dimethylamino alcohol; and
    (iv) the enzyme is a lipase from fraction B of *Candida antarctica* or from *Burkholderia plantarii*.

7. The process of claim 6, wherein
the alcohol is lauryl alcohol, with the proviso that mercaptoethanol or dimethylamino alcohol are not present.

8. The process of claim 5, wherein the copolymer comprises, in reacted form
from 10 to 90% by weight of component (A),
from 10 to 90% by weight of component (B),
from 0 to 50% by weight of component (C),
wherein a sum total of components A to C is 100% by weight.

9. The process of claim 1, wherein the esterifying or transesterifying (ii) is carried out at a temperature of from 20 to 100° C.

10. The process of claim 1, wherein the esterifying or transesterifying (ii) is carried out in a solvent.

11. The process of claim 1, wherein a molar ratio of the alcohol to the carboxyl group having the $R^4$ radical in is from 2 to 4:1 in the esterifying or transesterifying (ii).

12. A polymer, prepared by the process of claim 1.

13. A method of producing a product, the method comprising
incorporating the polymer of claim 12 into the product,
wherein the product is a fiber protectant in a laundry detergent, an incrustation inhibitor, a graying inhibitor, a corrosion protectant, a dispersed dye, a building chemical, an adhesive, paper, a dispersant, a dispersion, a lacquer, a coating, or a complexing agent.

14. The process of claim 2, wherein the alcohol in the esterifying or transesterifying (ii) is mercaptoethanol, dimethylamino alcohol, or lauryl alcohol.

15. The process of claim 5, wherein the component (C) is selected from the group consisting of styrene, acrylonitrile, vinyl acetate, vinyl propionate, vinyl chloride, and vinylidene chloride.

16. The process of claim 9, wherein the temperature is from 40 to 80° C.

17. The process of claim 10, wherein the esterifying or transesterifying (ii) is carried out in toluene.

18. The process of claim 1, wherein, in $R^3$ or $R^4$, the functional group is at least one selected from the group consisting of an acryloyl, an ether, an amine, an epoxide, a halogen, and a sulfonic acid.

19. A process for esterifying or transesterifying a side chain in a polymer, the process comprising:
esterifying or transesterifying a carboxyl group having a $R^4$ radical, comprised in a copolymer obtained by a process comprising polymerizing
(A) at least one (meth)acrylate of formula (I),

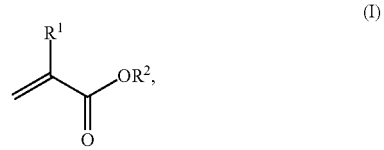

and
(B) at least one monomer of formula (II),

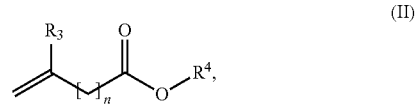

wherein
$R^1$ and $R^3$ are independently H or $CH_3$,
$R^2$ and $R^4$ are independently H or an alkyl radical which is optionally substituted by a functional group, and
n is from 1 to 40,
with an alcohol in the presence of an enzyme which catalyzes the esterifying or transesterifying.

20. The process of claim 1, wherein
(i) the component (A) is a $C_1$-$C_6$-alkyl acrylate, $C_1$-$C_6$-alkyl methacrylate, methacrylic acid, or acrylic acid,
(ii) in component (B), n is from 2 to 8 and $R^4$ is $C_1$-$C_4$-alkyl,
(iii) the alcohol is mercaptoethanol or dimethylamino alcohol, and
(iv) the enzyme is a lipase from fraction B of *Candida antarctica* or from *Burkholderia plantarii*.

* * * * *